United States Patent
Dupal et al.

(10) Patent No.: US 9,127,517 B2
(45) Date of Patent: Sep. 8, 2015

(54) DRILL PIPE CONNECTOR AND METHOD

(71) Applicant: Expert E&P Consultants, LLC, Madisonville, LA (US)

(72) Inventors: Kenneth Dupal, Mandeville, LA (US); Gary Allen Snyder, II, Covington, LA (US)

(73) Assignee: Expert E & P Consultants, L.L.C., Madisonville, LA (US)

(*) Notice: Subject to any disclaimer, the term of this patent is extended or adjusted under 35 U.S.C. 154(b) by 361 days.

(21) Appl. No.: 13/763,842

(22) Filed: Feb. 11, 2013

(65) Prior Publication Data

US 2013/0146305 A1    Jun. 13, 2013

Related U.S. Application Data

(63) Continuation-in-part of application No. 12/645,867, filed on Dec. 23, 2009, now abandoned.

(51) Int. Cl.
*E21B 19/16* (2006.01)
*F16L 21/00* (2006.01)
*E21B 17/043* (2006.01)

(52) U.S. Cl.
CPC ............... *E21B 19/16* (2013.01); *E21B 17/043* (2013.01); *F16L 21/00* (2013.01)

(58) Field of Classification Search
CPC ...... E21B 17/043; E21B 19/16; E21B 17/042
See application file for complete search history.

(56) References Cited

U.S. PATENT DOCUMENTS

| | | | |
|---|---|---|---|
| 2,296,198 A | 9/1942 | Boynton | |
| 4,787,463 A | 11/1988 | Geller et al. | |
| 5,417,291 A | 5/1995 | Leising | |
| 6,168,213 B1 | 1/2001 | Muller | |
| 6,283,511 B1 | 9/2001 | Kamp | |
| 6,893,054 B2 | 5/2005 | Chen | |
| 6,997,264 B2 | 2/2006 | Simpson et al. | |
| 7,431,351 B2 | 10/2008 | Russell | |
| 7,493,960 B2 | 2/2009 | Leising et al. | |
| 2004/0011520 A1* | 1/2004 | McGarian et al. | 166/117.7 |
| 2007/0013188 A1 | 1/2007 | Dallas et al. | |
| 2008/0093079 A1 | 4/2008 | Bryant et al. | |

* cited by examiner

*Primary Examiner* — David Andrews
(74) *Attorney, Agent, or Firm* — Jones Walker LLP

(57) ABSTRACT

A drill pipe connector assembly capable of connecting drill pipe segments without rotation. The assembly includes the pin end of a first drill pipe stabbed within the connector end of a second drill pipe. A connector nut is threadedly connected or snap locked to the connector end of the second drill pipe. The connector nut includes a retaining shoulder cooperating with a beveled shoulder on the pin end of the first drill pipe to retain the first drill pipe. The assembly includes seals to provide pressure integrity and prevent leaking. Cooperating rotational torque transfer profiles in the first and second drill pipes enable operational rotation of the drill string.

11 Claims, 11 Drawing Sheets

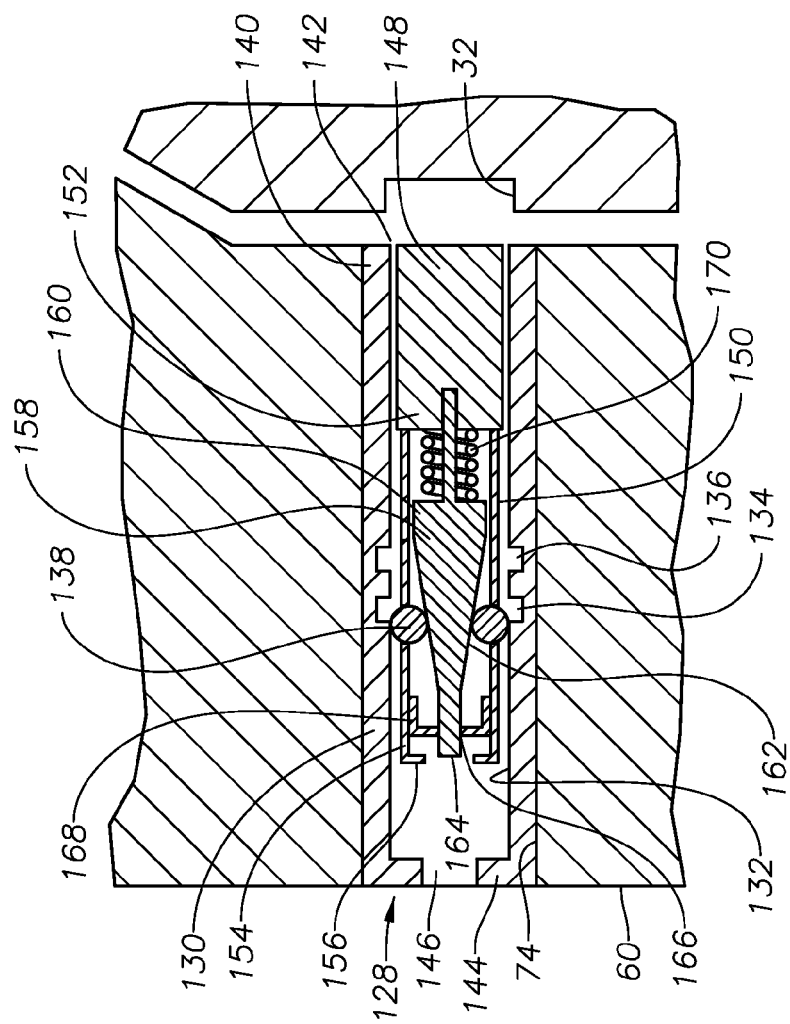
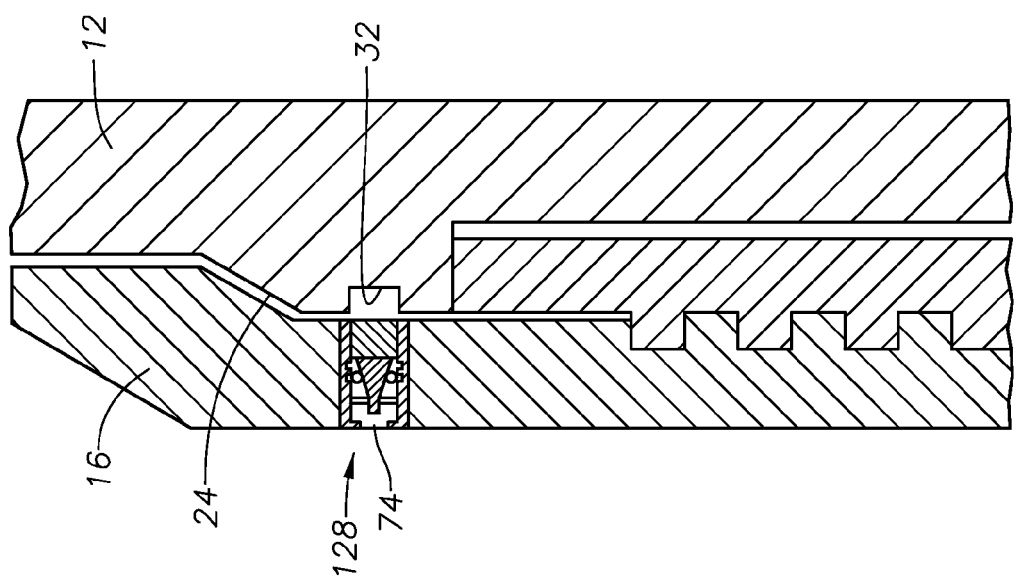
Fig. 11
Fig. 10

DRILL PIPE CONNECTOR AND METHOD

CROSS-REFERENCE TO RELATED APPLICATION

This application is a continuation-in-part of U.S. patent application Ser. No. 12/645,867, filed on Dec. 23, 2009, which is incorporated herein by reference.

FIELD OF THE INVENTION

The present invention relates to a drill pipe connector and method and more particularly to a drill pipe connector and method that connects without rotation of the drill pipe and without requiring high make-up torque.

BACKGROUND OF THE INVENTION

In the exploration and production of oil and gas, drill pipe or a column of drill pipe (e.g., a drill pipe string) may be employed for a variety of purposes. On a drilling rig, the drill string is made up on the rig's platform. The drill string is run downhole and into the well bore. The drill string transmits drilling fluid (via mud pumps) and rotational power (via a Kelly or top drive) to the drill bit, which is part of a bottom hole assembly positioned at the end of the drill string. The drilling fluid is pumped down through the internal bore in the drill string, exits at or near the drill bit, and circulates back up the well annulus (void between the drill string and the well bore). The drill pipe string may also run casing, a liner, or a landing string downhole. The drill pipe string may also be used to work-over a hydrocarbon well. Drill strings can reach a length of 30,000 feet for a vertically drilled well and 35,000 feet for a deviated or horizontal drilled well.

The drill string includes a column of individual joints or segments of drill pipe threadedly connected together by threaded ends. A joint or segment of drill pipe may vary in length. Typically, the length of a drill pipe joint ranges from 30 feet to 33 feet. A joint or segment of drill pipe has a box member secured at one end and a pin member secured at the other end. The box member is internally threaded and adapted to receive the pin member of another drill pipe joint, which has external threads. Mating joints of drill pipe are interconnected via the threads to make up the drill string. The joints of drill pipe must be securely made up to prevent leakage, wobbling, or unscrewing. Typically, power tongs are used to transmit sufficient rotational torque to the pipe joints to ensure that the pin end is tightly threaded in the box end; this is called make-up torque. The amount of torque required depends in part on the specific frictional properties of the threaded connections. A higher friction coefficient means increased torque transmitting ability thereby lessening instances of tool joints unscrewing and having to be made up downhole. A lower friction coefficient with less torque transmitting ability may cause too much torque to be applied when making up the joints. Excessive torque could stretch or burst the box member or crack or break the pin member. This is undesired as drill pipe is expensive.

Pipe "dope" may be applied to the threaded connections of the joints to maintain a high coefficient of friction. The dope permits easier breaking down of the tool joints and helps prevent excessive make up. Despite the application of pipe dope, excessive make up and joint damage remains a problem. Moreover, the use of power tongs to make up pipe increases operational costs as additional equipment and personnel are required. The need exists for equipment and methods to connect drill pipe joints without rotating the drill pipe into itself.

SUMMARY OF THE INVENTION

It is an object of the present invention to provide a drill pipe connector and method that does not require rotation to make up the drill pipe.

It is a further object of the present invention to provide a drill pipe connector and method that eliminates the need for power tongs.

It is a further object of the present invention to provide a drill pipe connector and method that imparts tensile strengths.

It is a further object of the present invention to provide a drill pipe connector and method that achieves pressure integrity.

It is a further object of the invention to provide a drill pipe connector and method that is capable of transferring rotational torque.

These and other objects and advantages are achieved by the novel drill pipe connector assembly described herein, which may include a first drill pipe segment. The first drill pipe segment may include an outer surface and an inner surface. The inner surface may form a first bore. The first drill pipe segment may have a pin end. The assembly may also include a second drill pipe segment having an outer surface and an inner surface. The inner surface may form a second bore. The second drill pipe segment may have a connector end, which is adapted to receive the pin end of the first drill pipe segment within the second bore. The assembly may also include a connector nut interconnecting the first drill pipe segment with the second drill pipe segment. Such interconnection achieves fluid communication between the first bore and the second bore. The connector nut may also include an outer surface, an inner surface, an upper section, and a lower section. The lower section of the connector nut may be detachably affixed to the connector end of the second drill pipe segment. The upper section of the connector nut may operatively retain the pin end of the first drill pipe segment.

The inner surface of the lower section of the connector nut may include a first set of threads. The outer surface of the connector end of the second drill pipe segment may include a second set of threads. The lower section of the connector nut may be threadedly affixed to the connector end of the second drill pipe segment via mating engagement of the first set of threads with the second set of threads. In one embodiment, the first and second set of threads may each be wicker-type threads. In another embodiment, the first and second set of threads may each be breech lock-type threads.

The inner surface of the upper section of the connector nut may include a retaining shoulder. The outer surface of the pin end of the first drill pipe segment may include a beveled shoulder. The retaining shoulder may cooperatively engage the beveled shoulder to operatively retain the pin end of the first drill pipe segment.

In another embodiment, the drill pipe connector assembly may include seal means. For example, the outer surface of the pin end of the first drill pipe segment may include one or more seal means forming a pressure seal between the outer surface of the pin end of the first drill pipe segment and the inner surface of the connector end of the second drill pipe segment.

In a further embodiment, the pin end of the first drill pipe segment may include a first rotational torque transfer profile. The inner surface of the connector end of the second drill pipe segment may include a second rotational torque transfer profile. The first and second rotational torque transfer profiles may operatively engage each other to transfer torque from the first drill pipe segment to the second drill pipe segment via the interconnection provided by the connector nut. In another embodiment, the pin end of the first drill pipe segment includes a distal end. The distal end may contain the first rotational torque transfer profile. In a further embodiment, the first rotational torque profile may include a first lateral surface and a tapered surface. The second rotational torque profile may include a second lateral surface and a second tapered surface. The first and second lateral surfaces and the first and second tapered surfaces may cooperatively engage each other to transfer the rotational torque through the drill string as a result of drilling or other operations.

The present invention is also directed to a method of making up drill pipe. The method may comprise providing a drill pipe connector assembly as previously described herein. The method may further include the step of stabbing the pin end of the first drill pipe segment into the connector end of the second drill pipe segment so that the first bore and the second bore are placed in fluid communication. The method may further include the step of detachably affixing the lower section of the connector nut to the connector end of the second drill pipe segment. The method may further include the step of causing the upper section of the connector nut to operatively retain the pin end of the first drill pipe segment. The method may further include the step of causing the seal means or plurality of seals to operatively seal the assembly to prevent leaking of a pressurized fluid flowing through the first and second bores.

In a further embodiment of the method of the present invention, the step of detachably affixing the lower section of the connector nut to the connector end of the second drill pipe segment may be accomplished by threadedly affixing the lower section of the connector nut to the connector nut end of the second drill pipe segment via mating engagement of the first set of threads with the second set of threads. Alternatively, the detachably affixing step may be accomplished by snap locking the lower section of the connector nut to the connector end of the second drill pipe segment via mating engagement of the first set of wicker-type threads with the second set of wicker-type threads. Alternatively, the detachably affixing step may be accomplished by rotating the lower section of the connector nut to the connector end of the second drill pipe segment via mating engagement of the first set of breech lock-type threads with the second set of breech lock-type threads via ½ turn of the connector nut.

In a further embodiment, the step of causing the upper section of the connector nut to operatively retain the pin end of the first drill pipe segment may be accomplished by positioning the retaining shoulder of the connector nut in cooperative engagement with the beveled shoulder of the first drill pipe segment to operatively retain the pin end of the first drill pipe segment.

In yet a further embodiment, the step of causing the seal means to operatively seal the assembly to prevent leaking of the pressurized fluid flowing through the first and second bores may be accomplished by causing the plurality of seals to form a pressure seal between the outer surface of the pin end of the first drill pipe segment and the inner surface of the connector end of the second drill pipe segment.

In an alternative embodiment, the method may include the step of causing the first and second rotational torque transfer profiles to operatively engage in order to transfer rotational torque from the first drill pipe segment to the second drill pipe segment via the interconnection provided by the connector nut.

BRIEF DESCRIPTION OF THE DRAWINGS

FIG. 10 is a partial cross-sectional view of the holding device of the connector assembly shown as an anti-rotation assembly in a neutral position.

FIG. 11 is a cross-sectional view of the alternative embodiment of the connector assembly shown in FIG. 10 with the anti-rotation assembly.

DETAILED DESCRIPTION OF THE PREFERRED EMBODIMENTS

Figure 1:
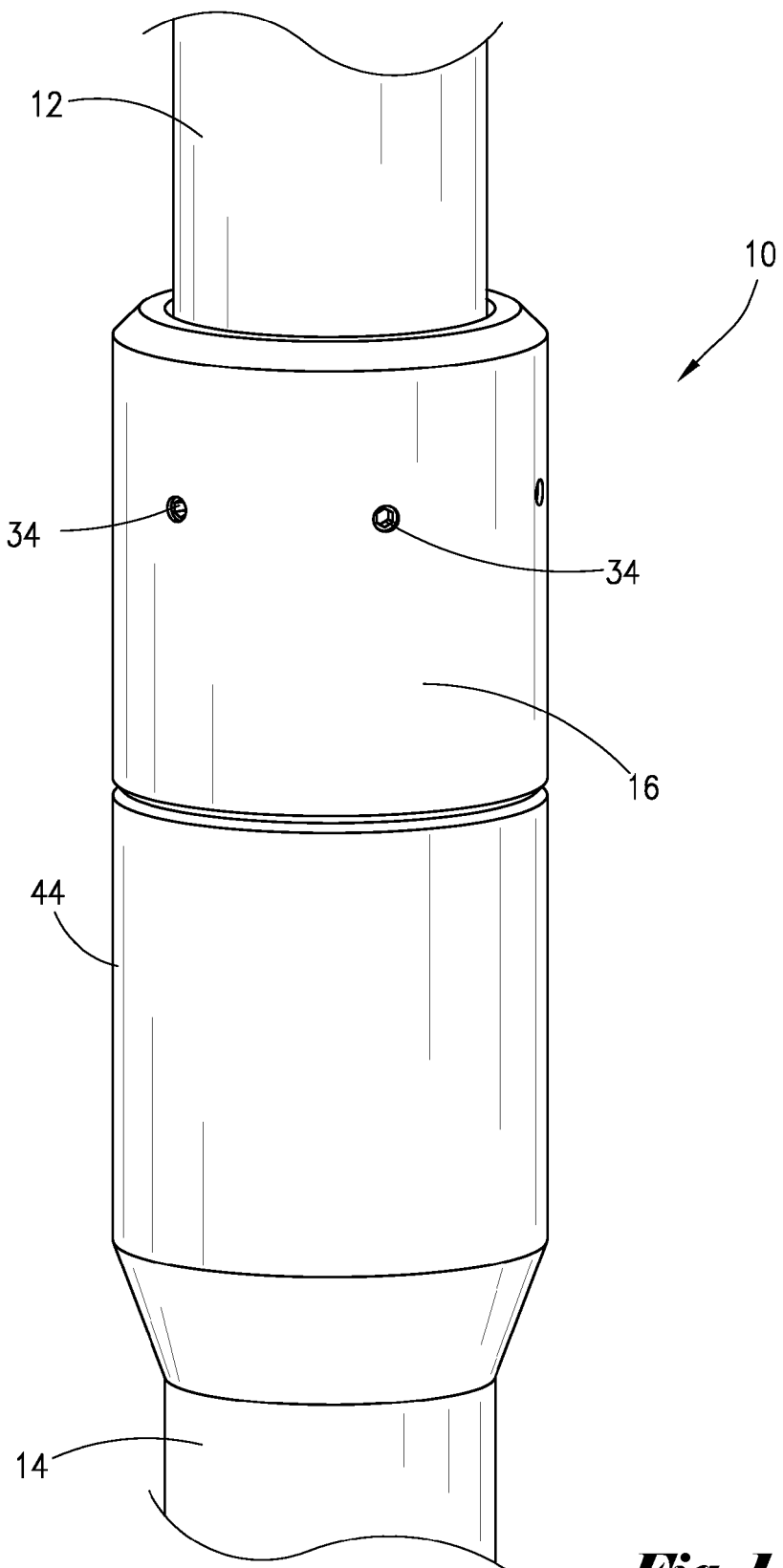
FIG. 1 is a perspective view of the connector assembly of the present invention.

With reference to the figures where like elements have been given like numerical designation to facilitate an understanding of the present invention, and in particular with reference to the embodiment of the present invention illustrated in FIG. 1, connector assembly 10 may include first drill pipe 12, second drill pipe 14 and connector nut 16.

Figure 2:
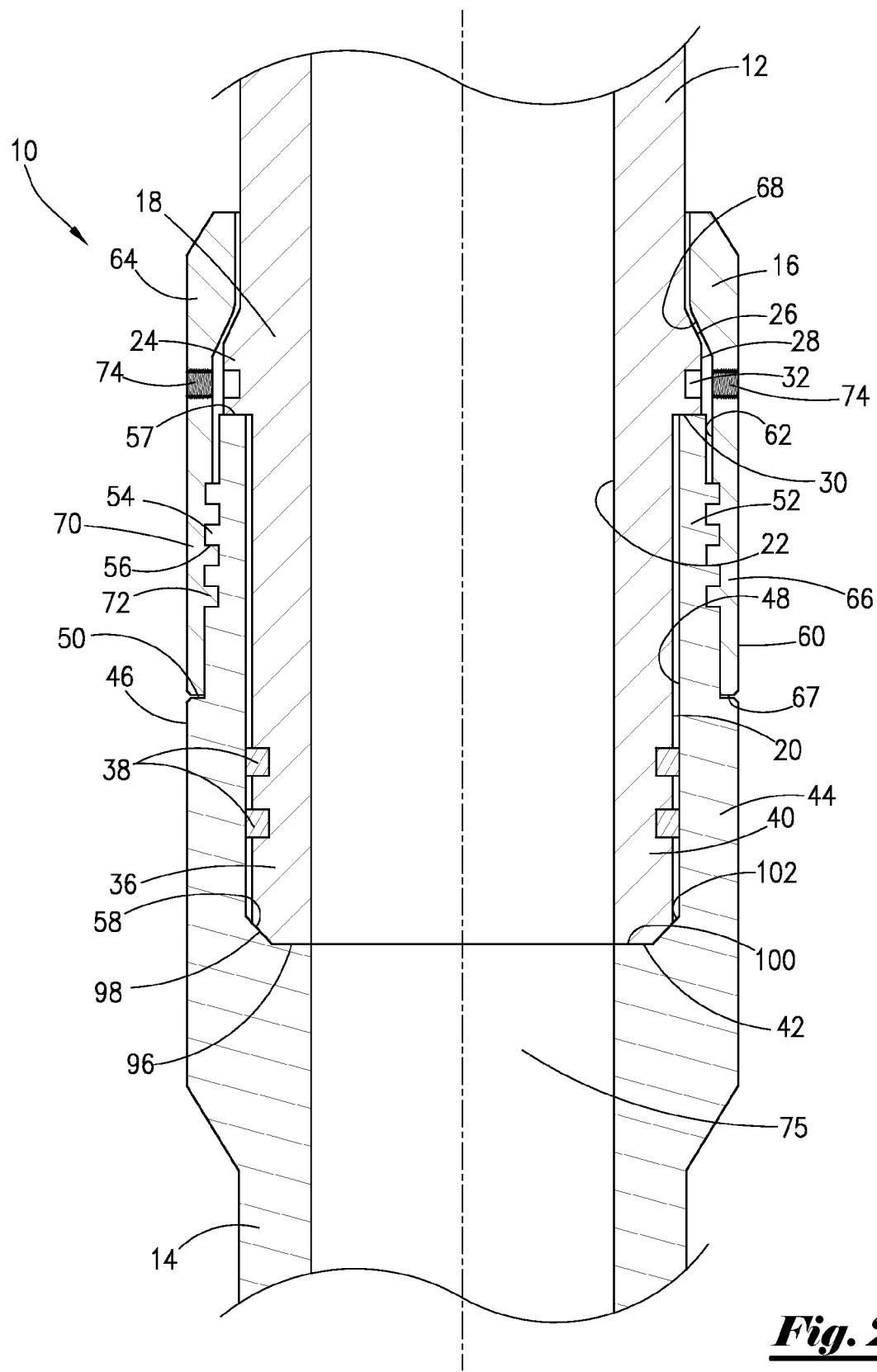
FIG. 2 is a cross-sectional view of the connector assembly of FIG. 1.

FIG. 2 shows that first drill pipe 12 may include pin end 18. Pin end 18 may include outer surface 20 and inner surface 22. Outer surface 20 of pin end 18 may include beveled shoulder 24. Shoulder 24 may include retaining face 26, holding face 28, and stop face 30. Shoulder 24 may also include one or more recesses 32 in holding face 28 for receiving a holding device 34 (not shown). Lower section 36 of pin end 18 may have one or more seals 38 positioned in outer surface 20. Seals 38 may be pressure seals formed of rubber, urethane, steel, plastic or other material capable of forming a seal that is leak resistant. Lower section 36 may include distal end 40. Distal end 40 may have torque transfer profile 42. Profile 42 may include lateral surface 96 and tapered surface 98.

With reference to FIG. 2, second drill pipe 14 may have connector end 44. Connector end 44 may have outer surface 46 and inner surface 48. Outer surface 46 may contain shoulder 50. Connector end 44 may also include upper section 52.

Outer surface 46 of upper section 52 may include connector nut means 54. Connector nut means 54 may be any device capable of detachably affixing connector nut 16 to upper section 52 of connector end 44 of second drill pipe 14. Connector nut means 54 may be threads 56. Upper section 52 may include support surface 57. Inner surface 48 of connector end 44 may have torque transfer profile 58. Profile 58 may include lateral surface 100 and tapered surface 102.

Again with reference to FIG. 2, connector nut 16 may be a tubular device having outer surface 60 and inner surface 62. Connector nut 16 may also include upper section 64 and lower section 66. Lower section 66 may include distal surface 67. Inner surface 62 of upper section 64 may have shoulder 68. Inner surface 62 of lower section 66 may contain connector end means 70. Connector end means 70 may be any device capable of cooperating with connector nut means 54 to detachably affix connector nut 16 to upper section 52 of connector end 44 of second drill pipe 14. Connector end means 70 may be threads 72 that cooperatively engage and disengage from threads 56. Threads 72 may also threadedly engage and disengage from threads 56. Connector nut 16 may contain one or more thru holes 74. Each hole 74 may house or contain holding device 34 (not shown). Each hole 74 may align with recess 32 in holding face 28 of pin end 18 of first drill pipe 12. Holding device 34 (not shown) may be positioned within aligned hole 74 and recess 32.

To make up or connect first drill pipe 12 to second drill pipe 14, connector nut 16 is positioned over first drill pipe 12. Pin end 18 of first drill pipe 12 is stung into connector end 44 of second drill pipe 14. As understood by one skilled in the art, this may be accomplished by positioning second drill pipe 14 in a slip, lifting first drill pipe 12 above second drill pipe 14, and then lowering pin end 18 of first drill pipe 12 into connector end 44 of second drill pipe 14. Stop face 30 of beveled shoulder 24 acts as a stop for pin end 18 by contacting support surface 57 of upper section 52 of second drill pipe 14. Connector nut 16 is secured to upper section 52 of second drill pipe 14 by rotating connector nut 16 so that connector nut 16 is threadedly connected to upper section 52 via threaded engagement of threads 54 and threads 70. Shoulder 50 of connector end 44 of second drill pipe 14 acts as a stop for connector nut 16 by contacting lower section 66 of connector nut 16 at distal surface 67. The detachable affixation of connector nut 16 to second drill pipe 14 compresses first drill pipe 12 and second drill pipe 14 together into operative connection. First drill pipe 12 is operatively connected to second drill pipe 14 via connector nut 16. Shoulder 68 of connector nut 16 cooperates with or engages beveled shoulder 24 of first drill pipe 12, and in particular, retaining face 26 of beveled shoulder 24, to hold or maintain first drill pipe 12 in position and operatively connected to second drill pipe 14. The operative engagement of threads 54 and threads 70 permits the tension load to be transferred to beveled shoulder 24 of first drill pipe 12. The operative connection of first and second drill pipes 12, 14 forms bore 75 through which pressurized fluid (e.g., drilling mud) may be pumped. Seals 38 form a seal between outer surface 20 of first drill pipe 12 and inner surface 48 of second drill pipe 14 to maintain pressure within first and second drill pipes 12, 14 and to prevent leaking of the drilling fluid. The operative connection of first and second drill pipes 12, 14 also causes operative engagement of torque transfer profile 42 of pin end 18 of first drill pipe 12 and torque transfer profile 58 of connector end 44 of second drill pipe 14. For example, lateral surface 96 cooperatively engages lateral surface 100 and tapered surface 98 cooperatively engages tapered surface 102. The operative engagement of torque transfer profiles 42, 58 permits rotational torque to be transferred from first drill pipe 12 to second drill pipe 14 through connector nut 16 (and in like fashion to any other drill pipe segments made up and comprising the drill pipe strand) during exploration or production operations such as drilling of a well.

Figure 3:
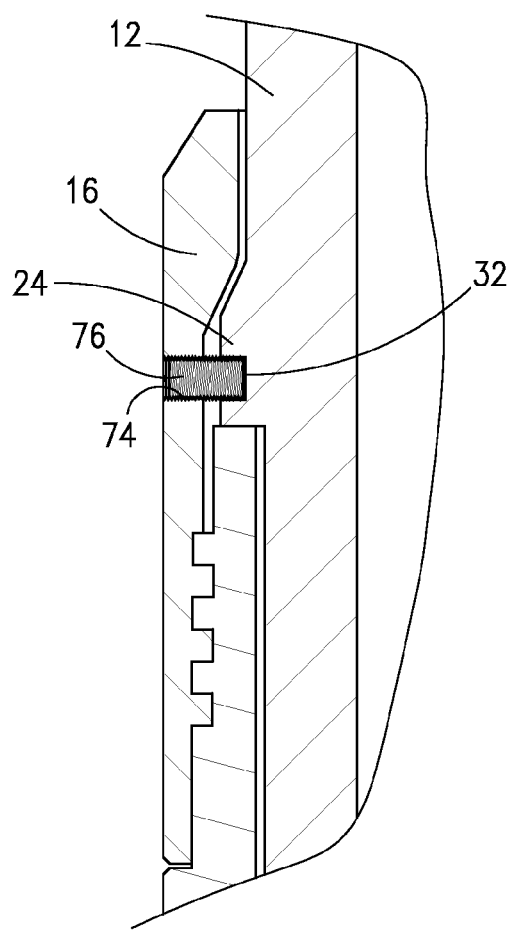
FIG. 3 is a partial cross-sectional view of the holding device of the connector assembly of the present invention shown as a set screw.

To ensure that connector nut 16 remains secured about first and second drill pipes 12, 14, holding device 34 may be employed to retain connector nut 16 in a fixed or stationary position relative to first and second drill pipes 12, 14. Holding device 34 ensures that connector nut 16, namely connector end means 70 or threads 72, do not detach or threadedly detach from connector nut means or threads 56 of second drill pipe 14 while connector assembly 10 rotates during operation of the drill string incorporating connector assembly 10. Holding device 34 may be any type of device capable of maintaining connector nut 16 in fixed position about first drill pipe 12. One or more holding devices 34 may be used, as for example, two, three, or four holding devices 34. Preferably, holding device 34 fixedly connects connector nut 16 to beveled shoulder 24 of pin end 18 of first drill pipe 12. For example, holding device 34 may be set screw 76 as show in FIG. 3. Screw 76 may be inserted into thru hole 74 of connector nut 16 and into recess 32 of beveled shoulder 24 to thereby fixedly attach connector nut 16 to beveled shoulder 24 of first drill pipe 12. Removal of screw 76 from recess 32 disengages the direct fixed connection between connector nut 16 and beveled shoulder 24 of first drill pipe 12.

Figure 4:
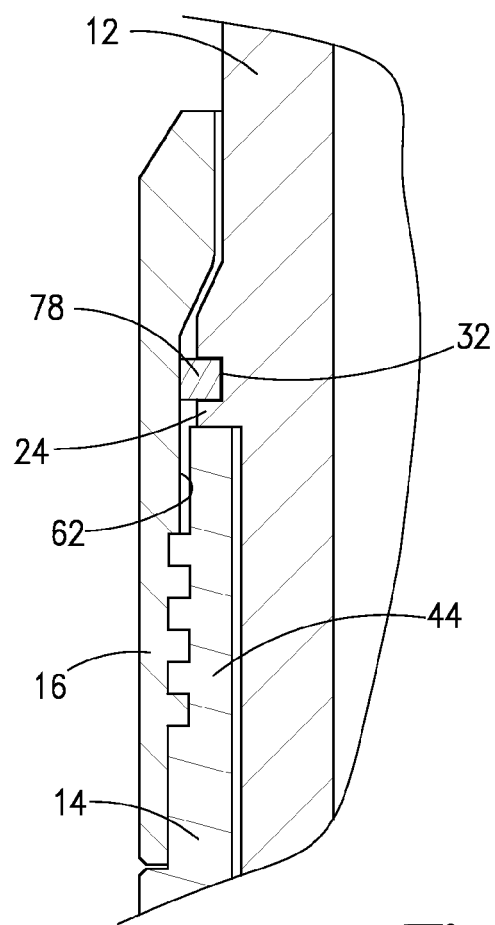
FIG. 4 is a partial cross-sectional view of the holding device of the connector assembly of the present invention shown as a snap latch.

As seen in FIG. 4, holding device 34 may also be snap latch 78. Latch 78 may be inserted into thru hole 74 and into recess 32 to affix connector nut 16 to beveled shoulder 24 of first drill pipe 12. Latch 78 may also be made integral with connector nut 16 or fixed to inner surface 62 (e.g., via welding) and extend outward from inner surface 62. Latch 78 would snap into recess 32 when connector nut 16 is connected to connector end 44 of second drill pipe 14 and disengage from recess 32 when connector nut 16 is detached from connector end 44 of second drill pipe 14. Alternatively, holding device 34 may be anti-rotation assembly 128 as discussed in more detail in connection with FIGS. 10-13 below.

Figure 5:
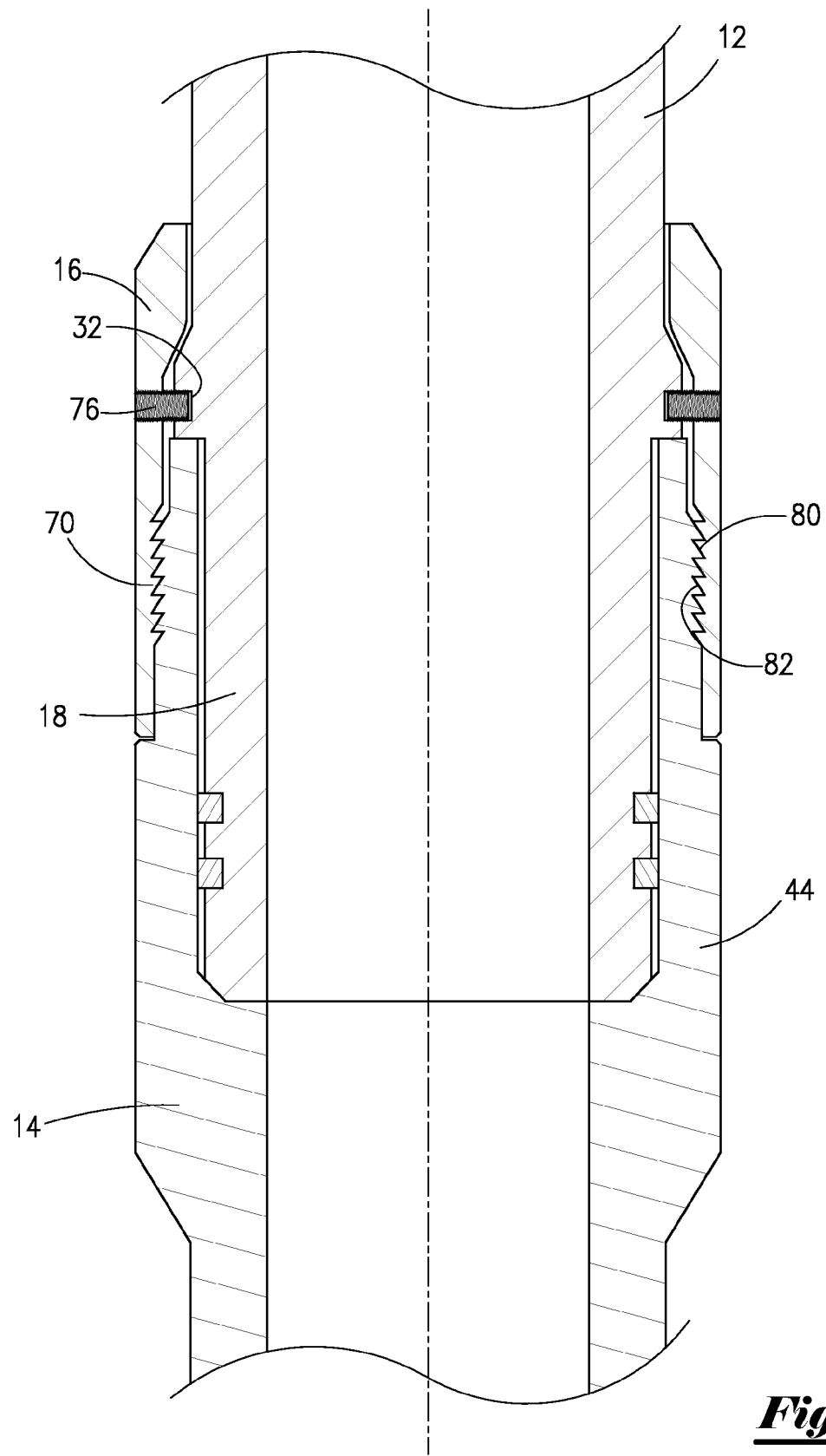
FIG. 5 is a cross-sectional view of an alternative embodiment of the connector assembly of the present invention.

FIG. 5 shows an alternative embodiment of connector assembly 10. Connector nut means 54 of second drill pipe 14 are formed as wicker-type threads 80. Connector end means 70 of connector nut 16 are formed as wicker-type threads 82. Rather than threadedly connecting connector nut 16 to connector end 44 of second drill pipe 14, in the alternative embodiment of assembly 10, wicker-type threads 82 of connector nut 16 and wicker-type threads 80 of second drill pipe 14 operatively engage when pin end 18 of drill pipe 12 is stabbed into connector end 44 of second drill pipe 14 to thereby make up first and second drill pipes 12, 14. Connector nut 16 may be disengaged from connector end 44 of second drill pipe 14 by rotating connector nut 16 of wicker-type threads 80 of second drill pipe 14. Alternative assembly 10 may include or not include one or more holding devices 34. If one or more holding devices 34 are included with alternative assembly 10, one or more holding devices 34 may be set screw 76, snap latch 78, or anti-rotation assembly 128 (as shown in FIGS. 10-13) to prevent connector nut 16 from rotating off and disengaging from second drill pipe 14 during rotation of alternative assembly 10 as would occur, for example, during drilling operations. FIG. 5 shows assembly 10 with set screws 76. In this embodiment, holding device 34 may be employed to lock connector nut 16 in a fixed position relative to first drill pipe 12 before first drill pipe 12 is connected to second drill pipe 14.

Figure 6:
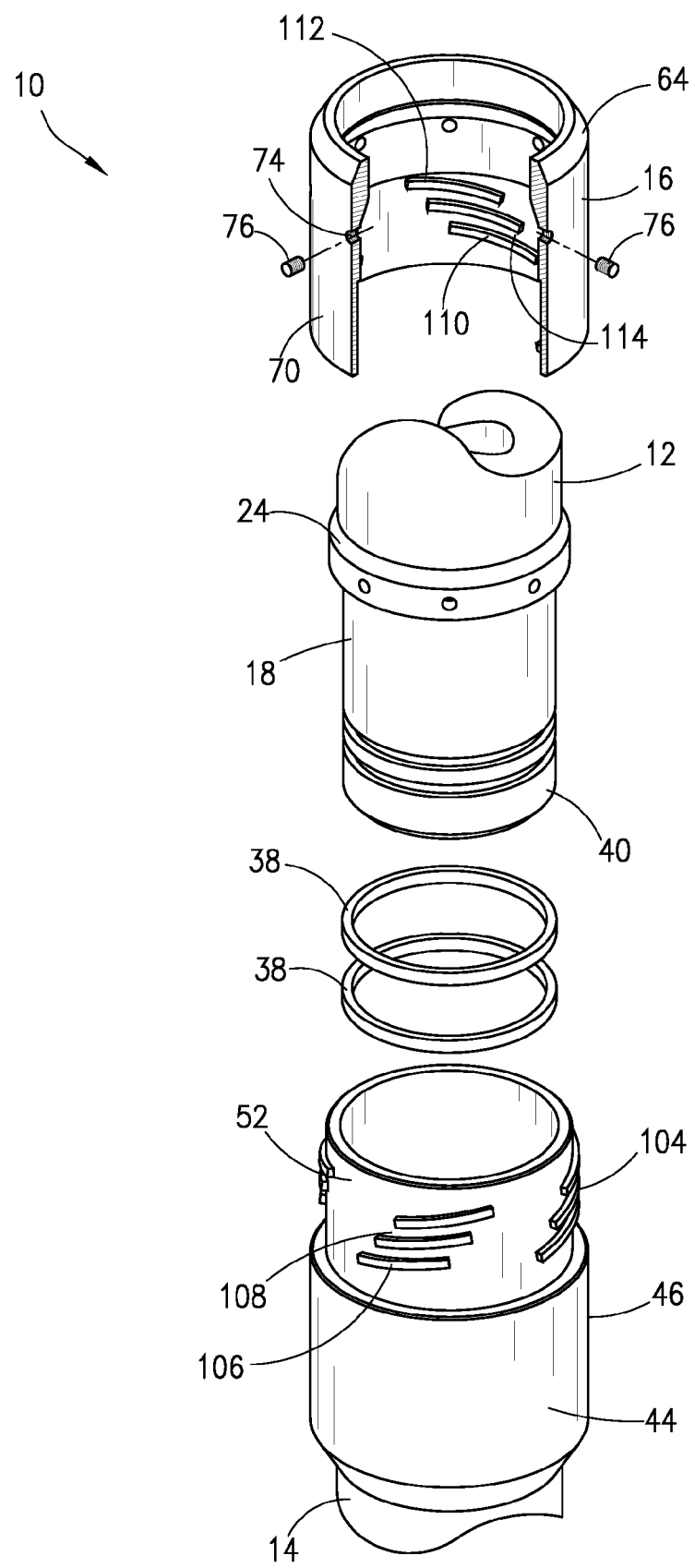
FIG. 6 is an exploded, partial cut-away, perspective view of a further alternative embodiment of the connector assembly of the present invention.

FIG. 6 reveals a further alternative assembly 10. In the further alternative assembly 10, connector nut means 54 of second drill pipe 14 are formed as breech lock-type threads 104. Breech lock-type threads 104 are interrupted helically threads that contain thread-sections 106 and gaps 108. Connector end means 70 of connector nut 16 are formed as breech lock-type threads 110. Breech lock-type threads 110 are interrupted helically threads that contain thread-sections 112 and gaps 114. Connector nut 16 is connected to connector end 44 of second drill pipe 14 by positioning each of thread-sections 112 of connector nut 16 within respective gaps 108 of second drill pipe 14 and rotating connector nut 16 in a first direction by a ½ turn causing mating engagement of each thread-section 106 of second drill pipe 14 with a corresponding thread-section 112 of connector nut 16. Thus, drill pipe 12 (operatively engaged within connector nut 16) and drill pipe 14 are made up. Drill pipes 12, 14 may be disengaged by rotating connector nut 16 in the opposite direction by a ½ turn and removing connector nut 16 (and associated drill pipe 12) from connector end 44 of second drill pipe 14. If one or more holding devices 34 are included with further alternative assembly 10, one or more holding devices 34 may be set screw 76, snap latch 78, or anti-rotation assembly 128 to prevent connector nut 16 from rotating off and disengaging from second drill pipe 14 during rotation of further alternative assembly 10 as would occur, for example, during drilling operations. FIG. 6 shows assembly 10 with set screws 76.

Figure 7:
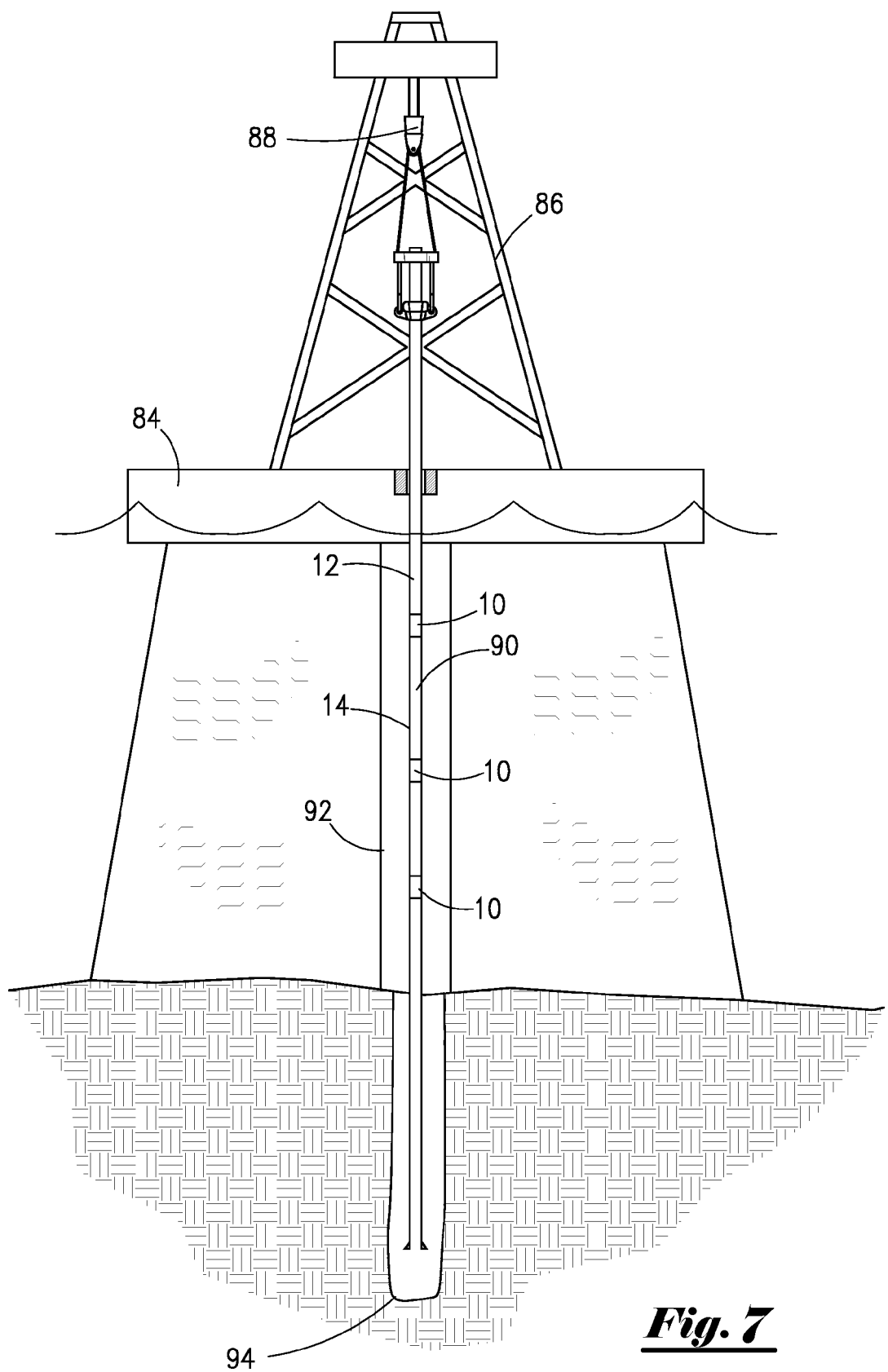
FIG. 7 is a schematic of a platform with a drill string composed of a plurality of connector assemblies of the present invention.

FIG. 7 shows a schematic of floating platform 84 containing drilling rig 86. Drilling rig 86 contains hoisting system 88 that is used to make up drill string 90 that is run down through marine riser 92 and into well 94. Drill string 90 comprises a series of first and second drill pipes 12, 14 connected together via connector assemblies 10. Drill string 90 may be used for drilling a well, tripping in a well, running and setting down hole equipment, or performing remedial work on a well. Additionally, drill string 90 may be used as a landing string to run heavy loads of casing into the well of a deep water oil well.

Figure 8:
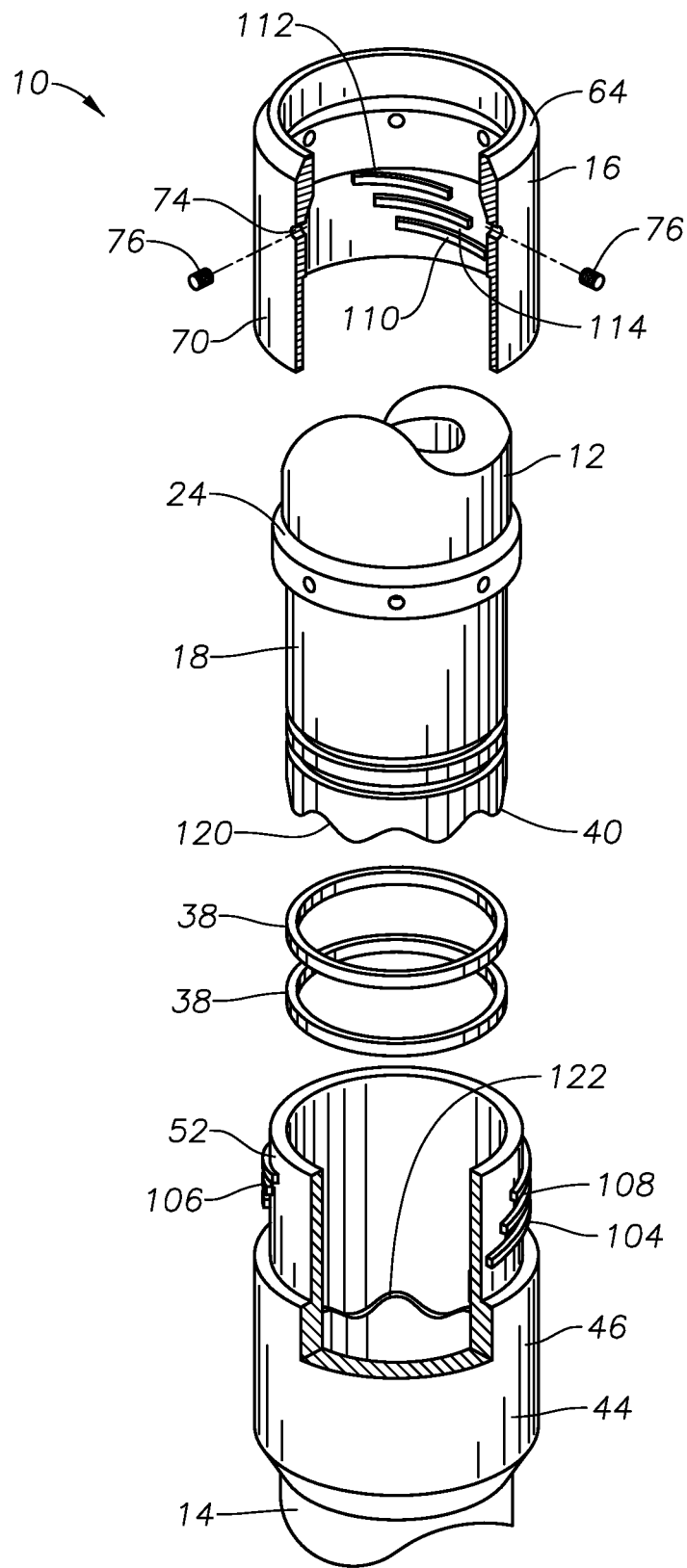
FIG. 8 is an exploded, partial cut-away, perspective view of an alternative embodiment of the connector assembly having wave-shaped surfaces.

FIG. 8 shows an alternative embodiment of connector assembly 10. In this alternative, torque transfer profile 42 of first drill pipe 12 may include wave-shaped surface 120, and torque transfer profile 58 of second drill pipe 14 may include wave-shaped surface 122. The operative connection of first and second drill pipes 12, 14 may cause reciprocal engagement of wave-shaped surface 120 of pin end 18 of first drill pipe 12 and wave-shaped surface 122 of connector end 44 of second drill pipe 14. The reciprocal engagement of wave-shaped surfaces 120 and 122 permits rotational torque to be transferred from first drill pipe 12 to second drill pipe 14.

Figure 9:
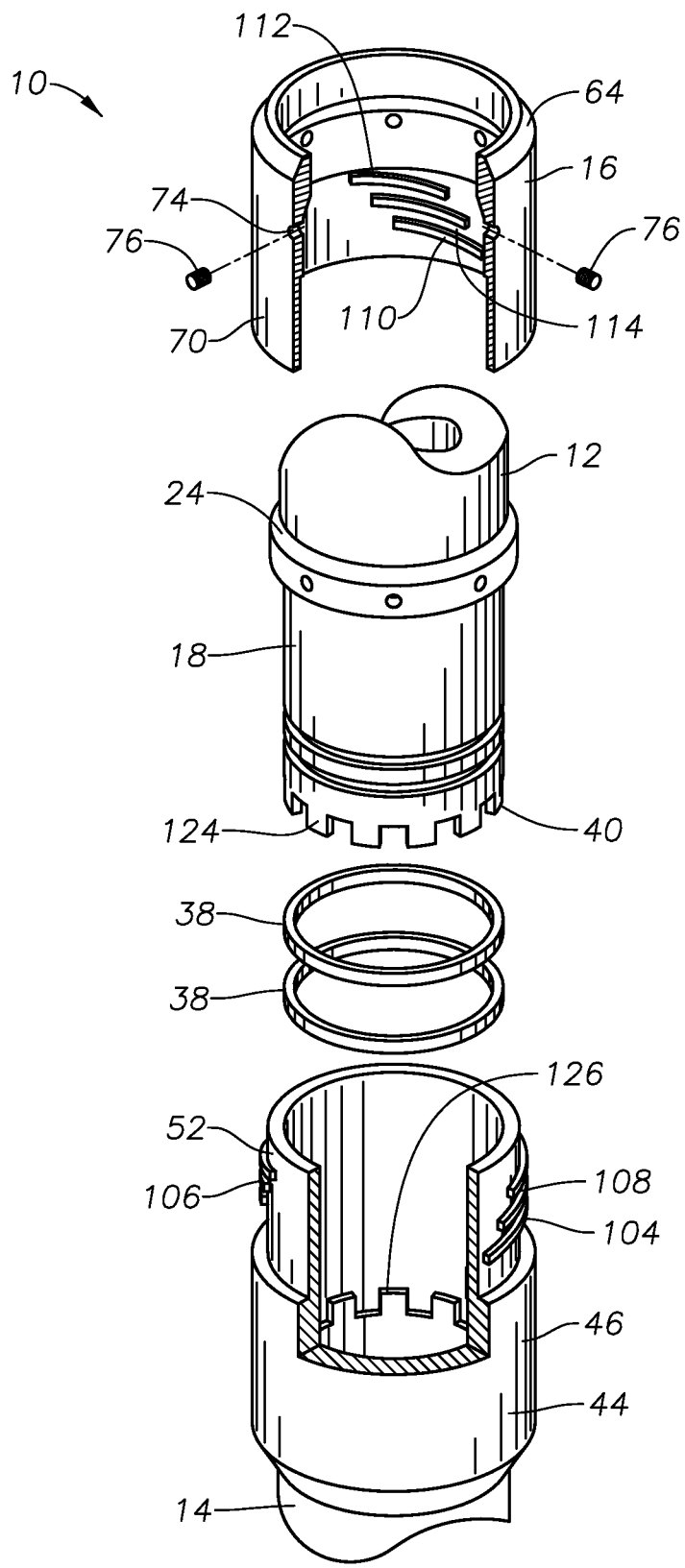
FIG. 9 is an exploded, partial cut-away, perspective view of an alternative embodiment of the connector assembly having castle-shaped surfaces.

FIG. 9 shows another alternative embodiment of connector assembly 10. In this alternative, torque transfer profile 42 may include castle-shaped surface 124, and torque transfer profile 58 of second drill pipe 14 may include castle-shaped surface 126. In this alternative, the operative connection of first and second drill pipes 12, 14 may cause reciprocal engagement of castle-shaped surface 124 of pin end 18 of first drill pipe 12 and castle-shaped surface_126 of connector end 44 of second drill pipe 14. The reciprocal engagement of castle-shaped surfaces 124 and 126 permits rotational torque to be transferred from first drill pipe 12 to second drill pipe 14.

In the alternatives shown in FIGS. 8 and 9, connector nut means 54 of second drill pipe 14 may be any device capable of detachably affixing connector nut 16 to upper section 52 of connector end 44 of second drill pipe 14, while connector end means 70 may be any device capable of cooperating with connector nut means 54 to detachably affix connector nut 16 to connector end 44 of second drill pipe 14. For example, connector nut means 54 and connector end means 70 may be threads 56 and 72, wicker-type threads 80 and 82, or breech lock-type threads 104 and 110. In FIGS. 8 and 9, connector nut means 54 and connector end means 70 are shown as breech lock-type threads 104 and 110.

FIG. 10 shows a partial view of yet another alternative embodiment of connector assembly 10 in which holding device 34 may be anti-rotation assembly 128. Anti-rotation assembly 128 may be disposed within thru hole 74 in connector nut 16. As shown in FIG. 11, anti-rotation assembly 128 may include body 130 having inner surface 132 with a set of outer bearing cavities 134 and a set of inner bearing cavities 136. Outer and inner bearing cavities 134, 136 may be adapted to selectively engage a set of bearings 138. The number of outer and inner bearing cavities 134, 136 may be equal to the number of bearings 138. Anti-rotation assembly 128 may include any number of bearings 138. In preferred embodiments, anti-rotation assembly 128 may include two or three bearings 138. Body 130 may also have proximal end 140 with proximal opening 142 and distal end 144 with distal opening 146.

Referring still to FIG. 11, stopper 148 may be disposed within body 130 adjacent to proximal opening 142. Support member 150 may extend from distal end 152 of stopper 148. Distal end 154 of support member 150 may have one or more protuberances 156. Plug 158 may be disposed within support member 150. Plug 158 may have proximal end 160, tapered outer surface 162, and distal neck 164. Distal neck 164 may be slidingly disposed through aperture 166 in guide 168 of support member 150 which may be positioned within distal end 154. Guide 168 may be fixedly attached within distal end 154 of support member 150. Alternatively, guide 168 may be an integral part of distal end 154 of support member 150. Tapered outer surface 162 may selectively force bearings 138 into outer or inner bearing cavities 134 or 136. Spring 170 may be disposed between proximal end 160 of plug 158 and distal end 152 of stopper 148. Connector assembly 10 may include two or more anti-rotation assemblies 128 in each thru hole 74.

FIG. 11 illustrates anti-rotation assembly 128 in a neutral position. In the neutral position, tapered outer surface 162 of plug 158 may secure bearings 138 in engagement with outer bearing cavities 134 such that stopper 148 is disposed entirely within proximal end 140 of body 130.

Figure 13:
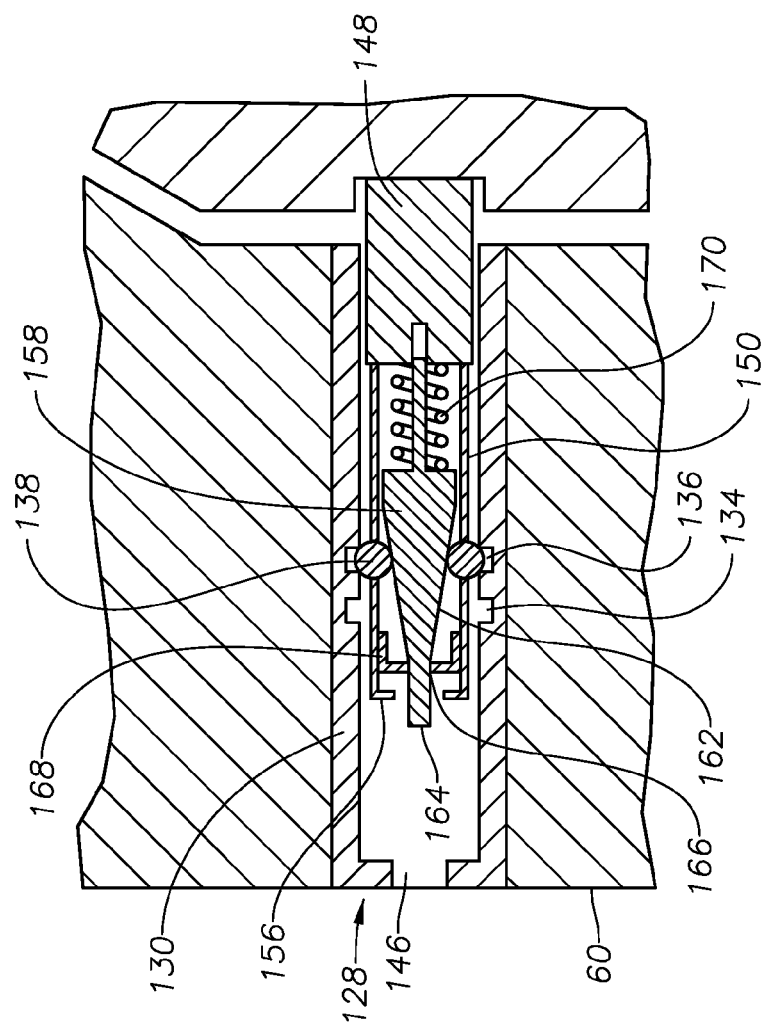
FIG. 13 is a cross-sectional view of the alternative embodiment of the connector assembly shown in FIG. 12 with the anti-rotation assembly.
Figure 12:
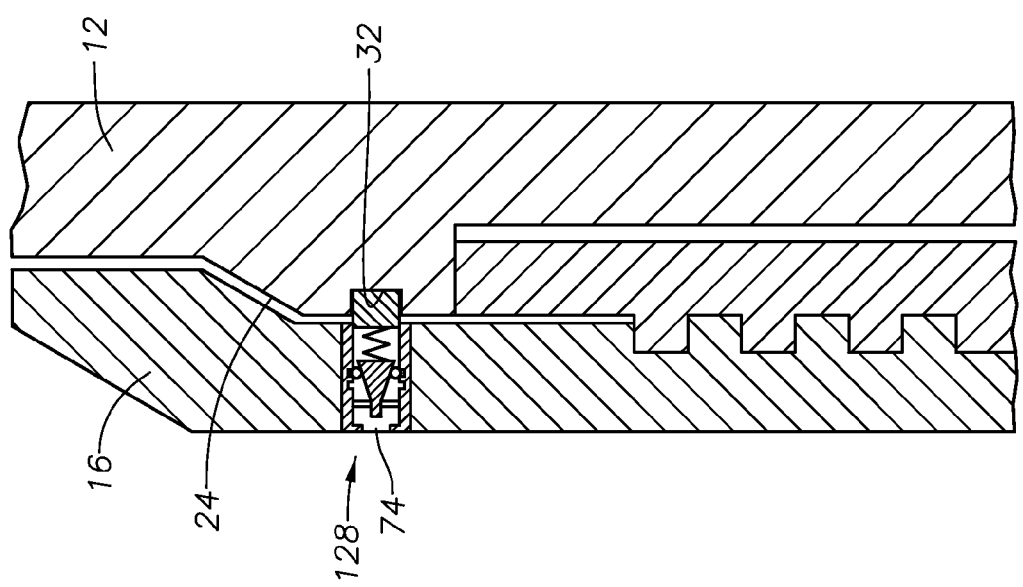
FIG. 12 is a partial cross-sectional view of the holding device of the connector assembly shown as an anti-rotation assembly in an engaged position.

FIGS. 12 and 13 illustrate anti-rotation assembly 128 in the engaged position in which stopper 148 engages recess 32 of first drill pipe 12. In this position, anti-rotation assembly 128 fixedly connects connector nut 16 to beveled shoulder 24 of pin end 18 of first drill pipe 12. Tool 180 (shown in FIG. 14) may be used to move anti-rotation assembly 128 between the neutral position shown in FIG. 11 and the engaged position shown in FIG. 13.

Figure 14:
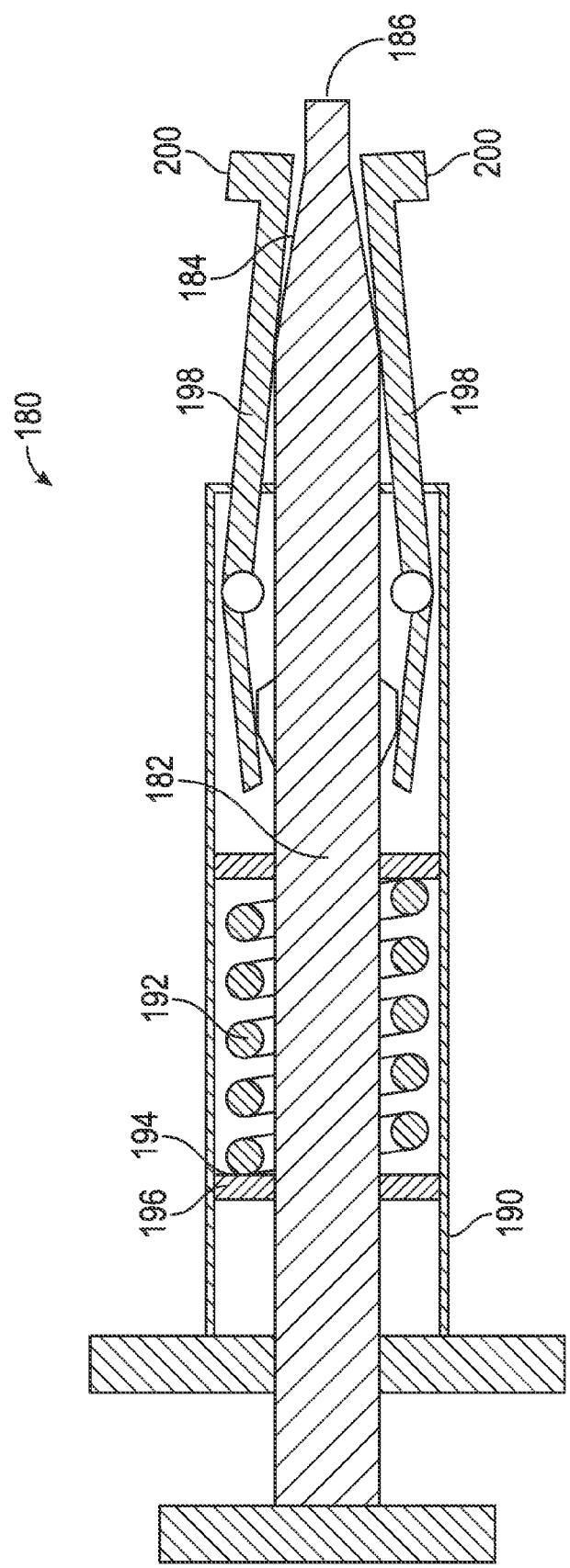
FIG. 14 is a plan view of a tool for the anti-rotation assembly.

Referring now to FIG. 14, tool 180 may include central member 182 having tapered outer surface 184 leading to compression tip 186 at a distal end of tool 180. Central member 182 may be disposed within housing 190. Spring 192 may also be disposed within housing 190 around central member 182. Distal end 194 of spring 192 may be operatively connected to central member 182, such as through connection member 196. Connection member 196 may be a ring disposed around central member 182, a radial extension from central member 182, or any other mechanism for connecting distal end 194 of spring 192 to a fixed point on central member 182. Tool 180 may further include arms 198 extending from within housing 190 and positioned around central member 182. Each arm 198 may include extension 200 at its distal end. Tool 180 may include two or more arms 198 positioned around central member 182.

With reference to FIGS. 11, 13, and 14, compression tip 186 of central member 182 and extensions 200 of each arm 198 of tool 180 may be inserted through distal opening 146 of body 130 and past protuberances 156. Compression tip 186 of central member 182 may engage distal neck 164 of plug 158. Selectively applying force to tool 180 may cause compression tip 186 to cause distal neck 164 to slide forward through aperture 166 in guide 168 until extensions 200 of arms 198 engage an outer surface of guide 168. This will compress spring 170. The displacement of plug 158 may release bearings 138 from outer bearing cavities 134 thereby allowing the displacement of support member 150 within body 130. By further selectively applying force to tool 180, extensions 200 of arms 198 may cause support member 150 to be projected forward such that stopper 148 engages recess 32 of first drill pipe 12. Withdrawing tool 180 from body 130 may allow spring 170 to push plug 158 such that distal neck 164 is again disposed through aperture 166. As plug 158 travels backward, tapered outer surface 162 may force bearings 138 into engagement with inner bearing cavities 136 such that anti-rotation assembly 128 is locked in the engaged position as shown in FIG. 13.

Tool 180 may also be used to return anti-rotation assembly 128 to the neutral position shown in FIG. 11. In the same way, compression tip 186 of central member 182 and extensions 200 of arms 198 may be inserted to displace plug 158 forward and compress spring 170. Bearings 138 may be released from inner bearing cavities 136 by the displacement of plug 158. A user may apply additional force to central member 182 such that compression tip 186 extends further beyond extensions 200 of arms 198. As central member 182 slides through arms 198, spring 192 may be compressed and tapered outer surface 184 of central member 182 may force extensions 200 of arms 198 radially outward such that extensions 200 may engage an inner surface of protuberances 156. A user may then pull tool 180 outwardly such that extensions 200 apply backward force to protuberances 156 thereby pulling support member 150 backward and stopper 148 out of engagement with recess 32 of first drill pipe 12. The user may then release the additional force from central member 182 such that spring 192 pulls central member 182 back to its initial position allowing extensions 200 to retract and again fit through the opening between protuberances 156. After releasing protuberances 156 and distal neck 164 of plug 158, spring 170 may push plug 158 backward such that tapered outer surface 162 forces bearings 138 into engagement with outer bearing cavities 134 and anti-rotation assembly 128 is locked in the neutral position.

Connector assembly 10 may be easier to use, easier to maintain, and safer than conventional means of connecting drill pipe segments. Because the drill pipe may not need to be rotated to make up the connection, connector assembly 10 may be used with full robotics, with automated rigs, or for rigless intervention work.

While preferred embodiments of the present invention have been described, it is to be understood that the embodiments described are illustrative only and that the scope of the invention is to be defined solely by the appended claims when accorded a full range of equivalents, many variations and modifications naturally occurring to those skilled in the art from a perusal hereof.

What is claimed is:

1. A drill pipe connector assembly, comprising:
   a first drill pipe segment including an outer surface, an inner surface, and a recess in said outer surface, said inner surface forming a first bore, said first drill pipe segment having a pin end;
   a second drill pipe segment including an outer surface and an inner surface, said inner surface forming a second bore, said second drill pipe segment having a connector end adapted to receive said pin end of said first drill pipe segment within said second bore;
   a connector nut interconnecting said first drill pipe segment with said second drill pipe segment to achieve fluid communication between said first bore and said second bore, said connector nut including an outer surface, an inner surface, an upper section, a lower section, and a thru hole in said upper section, said lower section of said connector nut detachably affixed to said connector end of said second drill pipe segment, said upper section of said connector nut operatively retaining said pin end of said first drill pipe segment;
   an anti-rotation assembly positioned in said thru hole of said connector nut, said anti-rotation assembly comprising:
      a body disposed within said thru hole of said connector nut, said body comprising an inner wall having an outer bearing cavity and an inner bearing cavity;
      a support member slidingly disposed within said body, said support member comprising a protuberance;
      a plug disposed within said support member, said plug comprising a tapered outer surface extending from a proximal end to a distal neck;
      a stopper dimensioned to slidingly fit within the body, a distal end of said stopper operatively connected to a proximal end of the support member,
      a spring disposed within said support member, said spring interconnecting said proximal end of said plug and said distal end of said stopper; and
      a bearing disposed between said support member and said tapered outer surface of said plug,
      wherein said stopper is selectively movable from a neutral position within said body in said thru hole to an engaged position in which said stopper engages said recess of said first drill pipe segment to maintain said connector nut in a fixed position relative to said first drill pipe segment; and wherein said bearing is dimensioned to engage said outer bearing cavity to secure said support member and said stopper in said neutral position and to engage said inner bearing cavity to secure said support member and said stopper in said engaged position.

2. The drill pipe connector assembly according to claim 1, wherein said inner surface of said lower section of said connector nut includes a first set of threads and said outer surface of said connector end of said second drill pipe segment includes a second set of threads, said lower section of said connector nut threadedly affixed to said connector end of said second drill pipe segment via mating engagement of said first set of threads with said second set of threads.

3. The drill pipe connector assembly according to claim 2, wherein said first and second set of threads are each wicker-type threads.

4. The drill pipe connector assembly according to claim 2, wherein said first and second set of threads are each breech lock-type threads, wherein the starting points of said breech lock-type threads of said first and second set of threads are staggered.

5. The drill pipe connector assembly according to claim 1, wherein said pin end of said first drill pipe segment includes a first rotational torque transfer profile and said inner surface of said connector end of said second drill pipe segment includes a second rotational torque transfer profile, said first and second rotational torque transfer profiles operatively engaging to transfer rotational torque from said first drill pipe segment to said second drill pipe segment via said interconnection provided by said connector nut.

6. A method of making up drill pipe, comprising the steps of:
   a) providing a drill pipe connector assembly, comprising: a first drill pipe segment including an outer surface, an inner surface, and a recess in said outer surface, said inner surface forming a first bore, said first drill pipe segment having a pin end with a first rotational torque transfer profile; a second drill pipe segment including an outer surface and an inner surface, said inner surface forming a second bore, said second drill pipe segment having a connector end adapted to receive said pin end of said first drill pipe segment within said second bore, wherein said inner surface of said connector end includes a second rotational torque transfer profile dimensioned to engage said first rotational torque transfer profile; a connector nut capable of interconnecting said first drill pipe segment with said second drill pipe segment to achieve fluid communication between said first bore and said second bore, said connector nut including an outer surface, an inner surface, an upper section, a lower section, and a thru hole in said upper section, said lower section of said connector nut capable of being detachably affixed to said connector end of said second drill pipe, said upper section of said connector nut capable of operatively retaining said pin end of said first drill pipe segment; an anti-rotation assembly comprising: a body disposed within said thru hole of said connector nut, said body comprising an inner wall having an outer bearing cavity and an inner bearing cavity; a support member slidingly disposed within said body, said support member comprising a guide; a plug disposed within said support member, said plug comprising a tapered outer surface extending from a proximal end to a distal neck, said distal neck dimensioned to fit through an aperture in said guide of said support member; a stopper dimensioned to slidingly fit within the body, a distal end of said stopper operatively connected to a proximal end of the support member; a spring disposed within said support member, said spring interconnecting said proximal end of said plug and said distal end of said stopper; and a bearing disposed between said support member and said tapered outer surface of said plug, said bearing dimensioned to engage said outer bearing cavity and said inner bearing cavity; and a plurality of seals capable of forming a pressure seal within said assembly;
   b) stabbing said pin end of said first drill pipe segment into said connector end of said second drill pipe segment so that said first bore and said second bore are placed in fluid communication and said first rotational torque transfer profile operatively engages said second rotational torque transfer profile in order to transfer rotational torque from said first drill pipe segment to said second drill pipe segment;
   c) detachably affixing said lower section of said connector nut to said connector end of said second drill pipe segment;
   d) causing said plurality of seals to operatively seal said assembly to prevent leaking of a pressurized fluid flowing through said first and second bores; and
   e) activating said anti-rotation assembly such that said stopper moves from a neutral position in which said stopper is disposed within said body in said thru hole to an engaged position in which said stopper engages said recess of said first drill pipe segment to maintain said connector nut in a fixed position relative to said first drill pipe segment; wherein activation of said anti-rotation assembly comprises the steps of:
      i) inserting a tool through a distal opening of said body and a distal opening of said support member in order to engage said distal neck of said plug with said tool;
      ii) applying pressure to said distal neck of said plug with said tool in order to displace said plug, compress said spring, and release said bearing from said outer bearing cavity;
      iii) applying pressure to said guide with said tool in order to slide said support member and said stopper to engage said recess of said first drill pipe segment with said stopper;
      iv) withdrawing said tool from said guide and said distal neck in order to expand said spring and transfer said bearing into said inner bearing cavity with said tapered outer surface of said plug to secure said support member and said stopper in said engaged position.

7. The method according to claim 6, wherein said inner surface of said lower section of said connector nut includes a first set of threads and said outer surface of said connector end of said second drill pipe segment includes a second set of threads, and wherein in step (c) said lower section of said connector nut is threadedly affixed to said connector end of said second drill pipe segment via mating engagement of said first set of threads with said second set of threads.

8. The method according to claim 7, wherein said first and second set of threads are each breech lock-type threads which are placed in mating engagement in step (c) by rotating said connector nut by a ½ turn, wherein the starting points of said breech lock-type threads of said first and second set of threads are staggered.

9. The method according to claim 6, wherein said inner surface of said lower section of said connector nut includes a first set of wicker-type threads and said outer surface of said connector end of said second drill pipe segment includes a second set of wicker-type threads, and wherein in step (c) said lower section of said connector nut is snap locked to said connector end of said second drill pipe segment via mating engagement of said first set of wicker-type threads with said second set of wicker-type threads.

10. The method according to claim 6, wherein said inner surface of said upper section of said connector nut includes a retaining shoulder and said outer surface of said pin end of said first drill pipe segment includes a beveled shoulder, and wherein in step (e) said retaining shoulder is positioned to cooperatively engage with said beveled shoulder to operatively retain said pin end of said first drill pipe segment.

11. The method according to claim 6, wherein said seal means include a plurality of pressure seals positioned on said outer surface of said pin end of said first drill pipe segment, and wherein in step (d) said plurality of seals form a pressure seal between said outer surface of said pin end of said first drill pipe segment and said inner surface of said connector end of said second drill pipe segment.

* * * * *